March 7, 1967 J. A. RAJCHMAN 3,308,445

MAGNETIC STORAGE DEVICES

Filed Sept. 22, 1958 3 Sheets-Sheet 1

INVENTOR.

JAN A. RAJCHMAN

BY Morris A. Rabkin

ATTORNEY

March 7, 1967 J. A. RAJCHMAN 3,308,445

MAGNETIC STORAGE DEVICES

Filed Sept. 22, 1958 3 Sheets-Sheet 2

INVENTOR.
JAN A. RAJCHMAN

BY Morris L. Rabkin

ATTORNEY

March 7, 1967 J. A. RAJCHMAN 3,308,445

MAGNETIC STORAGE DEVICES

Filed Sept. 22, 1958 3 Sheets-Sheet 3

INVENTOR.
JAN A. RAJCHMAN
BY

ATTORNEY

United States Patent Office 3,308,445
Patented Mar. 7, 1967

3,308,445
MAGNETIC STORAGE DEVICES

Jan A. Rajchman, Princeton, N.J., assignor to Radio Corporation of America, a corporation of Delaware Filed Sept. 22, 1958, Ser. No. 762,452
11 Claims. (Cl. 340—174)

This invention relates to improved magnetic devices useful in information storage and switching applications.

One of the most difficult problems encountered in the use of magnetic elements in storage and switching applications is the interconnection of a multiple of the elements by a multiple of selective windings. This problem is greatly simplified by the use of apertured plates of magnetic material wherein the material about each different aperture corresponds to a different magnetic element. One or more of the selective windings may be printed on the plate surfaces to link the separate elements. An article by the present applicant entitled, "Ferrite Apertured Plate for Random Access Memory," published in the March 1957 issue of the Proceedings of the I.R.E. describes various memory systems using apertured plates.

An object of the present invention is to provide improved apertured plates for use in magnetic storage and switching systems.

Another object of the present invention is to further simplify the problem of linking selective windings to a plurality of magnetic elements.

Still another object of the present invention is to further simplify the problem of making magnetic storage and switching systems.

According to the present invention, apertured magnetic plates are used which have a plurality of clusters of apertures provided in the material. The material about each cluster of apertures effectively acts as a single magnetic element. Each of the plurality of selecting windings is linked through a different aperture of a cluster. Thus, any one aperture has but one selecting winding linked therethrough.

One advantage frequently gained by the use of the invention in storage applications is that improved signal-to-noise ratios are obtained.

Figure 1:
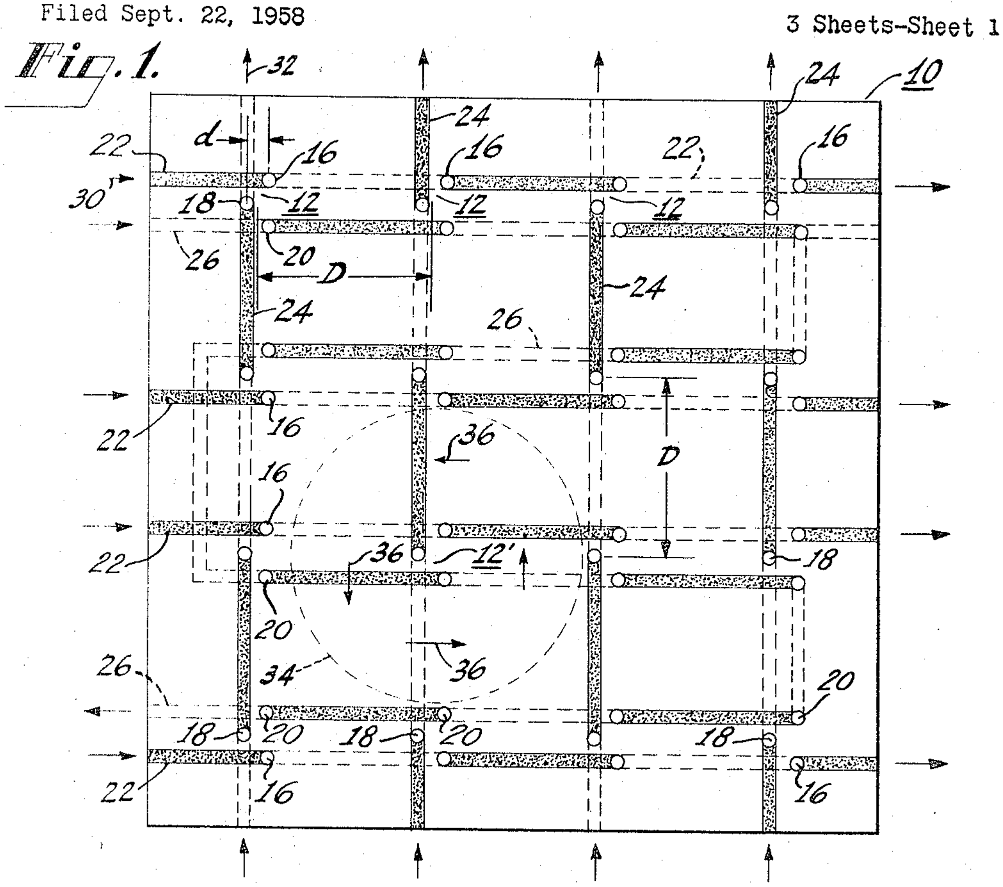
FIG. 1 is a plan view of an apertured plate according to the invention having three apertures in each cluster.

The apertured plate 10 of FIG. 1 is made of a substantially rectangular hysteresis loop magnetic material. Certain ceramic materials such as manganese-magnesium zinc ferrite and certain metallic materials such as 4–79 molybdenum-permalloy exhibit the desired rectangular hysteresis loop. Formed in the plate 10 is a plurality of clusters of apertures such as the 4 x 4 array of clusters 12. In the case of ceramic materials, the clusters 12 of apertures may be molded by using a suitable die, and in the case of metallic materials the various clusters of apertures may be etched by any suitable known process. Each cluster 12 of apertures includes, for example, three separate apertures 16, 18 and 20 for receiving three separate operating windings. These operating windings conveniently are provided by printed circuit techniques. The row apertures 16 in each row of clusters 12 are aligned with each other and the column apertures 18 of each column of clusters 12 are aligned with each other The middle column aperture 18 of each cluster 12, conveniently is located equidistantly from the row aperture 16 and the third aperture 20 of the same cluster, as shown. A plurality of row conductors 22 of conductive metallic material is printed on both surfaces of the plate and through the row apertures 16 of each different row of clusters 12. A plurality of column conductors 24 of conductive metallic material is printed on both surfaces of the plate and through the column apertures 18 of each column of clusters 12.

In the case of ferrite material, the conductors may be printed directly on the ferrite which has a sufficiently high coefficient of resistivity to prevent electrical short-circuiting between adjacent ones of the printed conductors. In the case of metallic material, a suitable insulating material may be coated or sprayed on both surfaces of the plate 10 and on the inside walls of the apertures after each printing of a set of the metallic conductors. The insulating material electrically separates any two of the printed conductors. A third winding 26 of conductive material is printed on both surfaces of the plate and through the apertures 20 of all the clusters 12. Suitable masking or spraying techniques are known for obtaining patterns of printed conductors which lie on both flat plate surfaces and which are interconnected through the material on the aperture walls.

The row conductor 22 and the column conductor 24 of any one cluster 12 link the row and column apertures 16 and 18 respectively, in the same sense, with respect to positive (conventional) current flow from one surface of the plate at the location of that cluster 12. The direction of positive (conventional) current flow in any conductor is indicated in the drawing by arrows adjacent that conductor. For example, the arrows 30 and 32 indicate positive (conventional) current flow in the row and column conductors 22 and 24. Each row and column winding 22 and 24, however, links any two adjacent clusters 12 in opposite senses. The common winding 26 links the apertures 20 of successive clusters 12 in successively opposite senses. The center-to-center spacing *d* of the apertures within a cluster 12 is made relatively small, say, for example, five times smaller than the center-to-center spacing D between the adjacent clusters.

In operation, each cluster 12 of apertures effectively functions as a single aperture having three separate windings printed on its inside walls. It is readily apparent that the problem of providing the separate operating windings in a plate according to the present invention is greatly simplified over that of prior devices which required all the windings to be linked through the same one aperture. In practice, the diameters of the apertures may be 15 mille-inches, or smaller.

The apertured plate 10 may be operated as a switching device, for example, as a D.C. (direct current) biased magnetic switch, or as a storage device. When operated as a switching device, the common winding 26 is linked through the aperture 20 (now a bias aperture) of any one cluster 12 in the sense opposite the linkage of the row and column windings 22 and 24 through the row and column apertures 16 and 18 of that one cluster 12. A D.C. current applied to the common winding 26 then biases the magnetic material surrounding each cluster 12 to saturation in successively opposite ones of the two states of saturation of the magnetic material. Separate output windings (not shown) may be threaded through any aperture of the separate clusters 12, or, as described hereinafter, separate output apertures may be provided.

During a switching operation, a desired cluster 12 is selected by applying suitable row and column currents to the row and column conductors 22 and 24 in a direction to oppose the D.C. bias current. The combined row and column currents in a cluster 12 are made of sufficient amplitude to overcome the D.C. bias and to change the material surrounding the selected cluster 12 from its initial saturated state to the opposite saturated state. Any one row or column selecting current is of insufficient amplitude to change any appreciable flux in the material about the non-selected clusters 12. Upon termination of the row and column selecting currents, the D.C. bias current returns the material about the selected cluster 12 to its initial saturated state.

Note that the amplitude of the row and column selecting currents can be as large as desired without adversely affecting the switch operation so long as the amplitude of the D.C. current is equal to that of the larger one of the row and column current amplitude. Conveniently, the row, column and D.C. currents are of equal amplitude. Thus, the portion of material actually changed during a switching operation may include all the material between the four non-selected clusters 12 of apertures surrounding the selected cluster 12. For example, assume the cluster 12′ at the intersection of the third row and second column of clusters 12 is selected. The portion of material available for change during a switching operation is indicated by the dotted circle 34. Observe that row and column currents of combined amplitude greater than that required to change the material within the dotted circle 34 do not produce undesired switching but only drive the material outside the dotted circle 34 further into saturation in the direction of the D.C. bias current. For example, assume that the material surrounding the selected aperture 12′ is saturated in one state, corresponding to a counter-clockwise flux flow as indicated by the four solid arrows 36. Note that the D.C. bias current always saturates the portions of material common to a selected cluster 12′ and any of the four adjacent clusters 12 in the same state with reference to the selected cluster 12′. Therefore, the D.C. bias current can be as large as desired. Also note that the next further portions of material on the other side of the four clusters 12 adjacent the selected cluster 12′ are saturated by the D.C. bias current in the opposite state with reference to the selected cluster 12′. Thus, these further portions of material can only be driven further into their already saturated states when the row and column selecting currents are applied to the row and column conductors of the selected cluster 12′.

A like analysis of the initial states of the portions of material still further distant from the cluster 12′, shows that these portions are also driven further into saturation by the row and column selecting currents flowing through the windings of selected cluster 12′. Thus, selecting currents when used with the plate 10 are noncritical in amplitude above a minimum value, a feature which is desirable in practicing the invention in switching applications. The minimum value of selecting current is that required to produce sufficient flux change in the material about the selected cluster 12′ to provide the desired output current to a load device. When the row and column selecting currents are removed, the D.C. bias returns the switched portion of material about the selected cluster 12′ to the initial direction of saturation, as indicated by the solid arrows 36. Any other cluster of apertures 12 may be selected for producing an output signal in similar fashion.

The operation of the system differs when the plate 10 is used as a storage device. Thus, the amplitudes of the selecting currents applied to the row and column windings 22 and 24 now are regulated to a value such that the net magnetizing force changes flux only in a smaller portion of material enclosed by a circle of radius equal to or less than ½ the radius of the dotted circle 34. The smaller portions of material then effectively provide separate storage locations for storing separate units of information. By thus limiting the areas of the storage locations, undesired interaction is prevented between adjacent ones of the stored units of information during a reading or a writing operation. During use of the plate 10 for storage applications, the common winding 26 may be the read-out winding for coincident-current type operation. Also, the common winding 26 may be used both as the read-out and the inhibit winding in certain storage systems, such as the three-dimensional systems described in the aforementioned Rajchman article.

One advantage obtained in using clusters of apertures for storage is that improved signal-to-noise ratios are obtained during a reading operation. That is, the so-called "disturb" signals produced by one row or column selecting current alone are reduced in amplitude. The reason for such reduction results largely from the geometry of the cluster arrangement. Thus, neglecting air flux, no signal can be produced in the common winding 26 in the absence of changing flux linking the winding 26. Therefore, flux changes produced in the portions of material between either the row and column apertures 16 and 18 and the third aperture 20 (now the output aperture) do not induce any output signal in the winding 26. Thus, a half-amplitude selecting current (row or column) must be of sufficient amplitude to cause flux changes on the other side of the output aperture 20 before any "disturb" signals are induced. Observe that in the case when all three operating windings link the same one aperture as in prior storage devices, these half-amplitude selecting currents do induce disturb signals. Thus, the signal-to-noise ratio in the aperture plate 10 of the invention is improved over the signal-to-noise ratio of prior memories of similar type.

Figure 2:
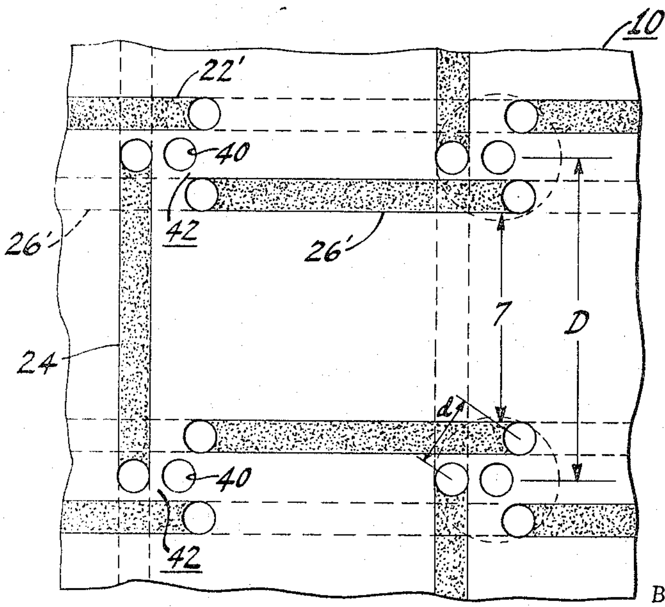
FIG. 2 is a plan view of a fragmentary portion of another apertured plate according to the invention having four apertures in each cluster.

As shown in the embodiment of FIG. 2 for a plate 10′, each cluster of apertures may be provided with a fourth aperture 40 for receiving an output winding. In FIG. 2, the fourth aperture 40 of the clusters 42 is located equidistant from the other three apertures.

Figure 3:
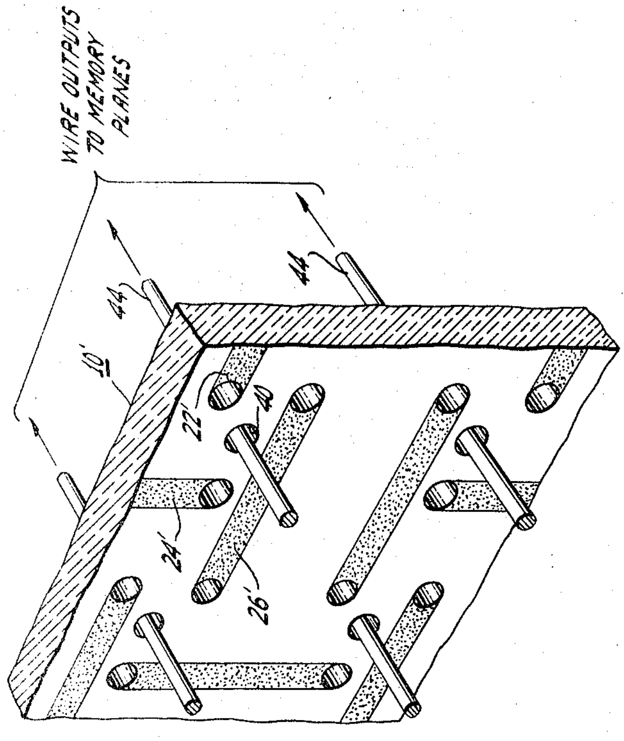
FIG. 3 is a perspective view of a partial portion of an apertured plate according to the invention having four apertures in each cluster.

As shown in FIG. 3, a separate output conductor 44 may be threaded through each separate output aperture 40. When the plate 10′ is used in the storage devices, the separate conductors 44 may be the different access lines as in an "end-on" or a "word-organized" memory system. The common winding 26′ linking one aperture in all the clusters 42 then is used as the read-out or inhibit winding for the storage device 10′.

Figure 4:
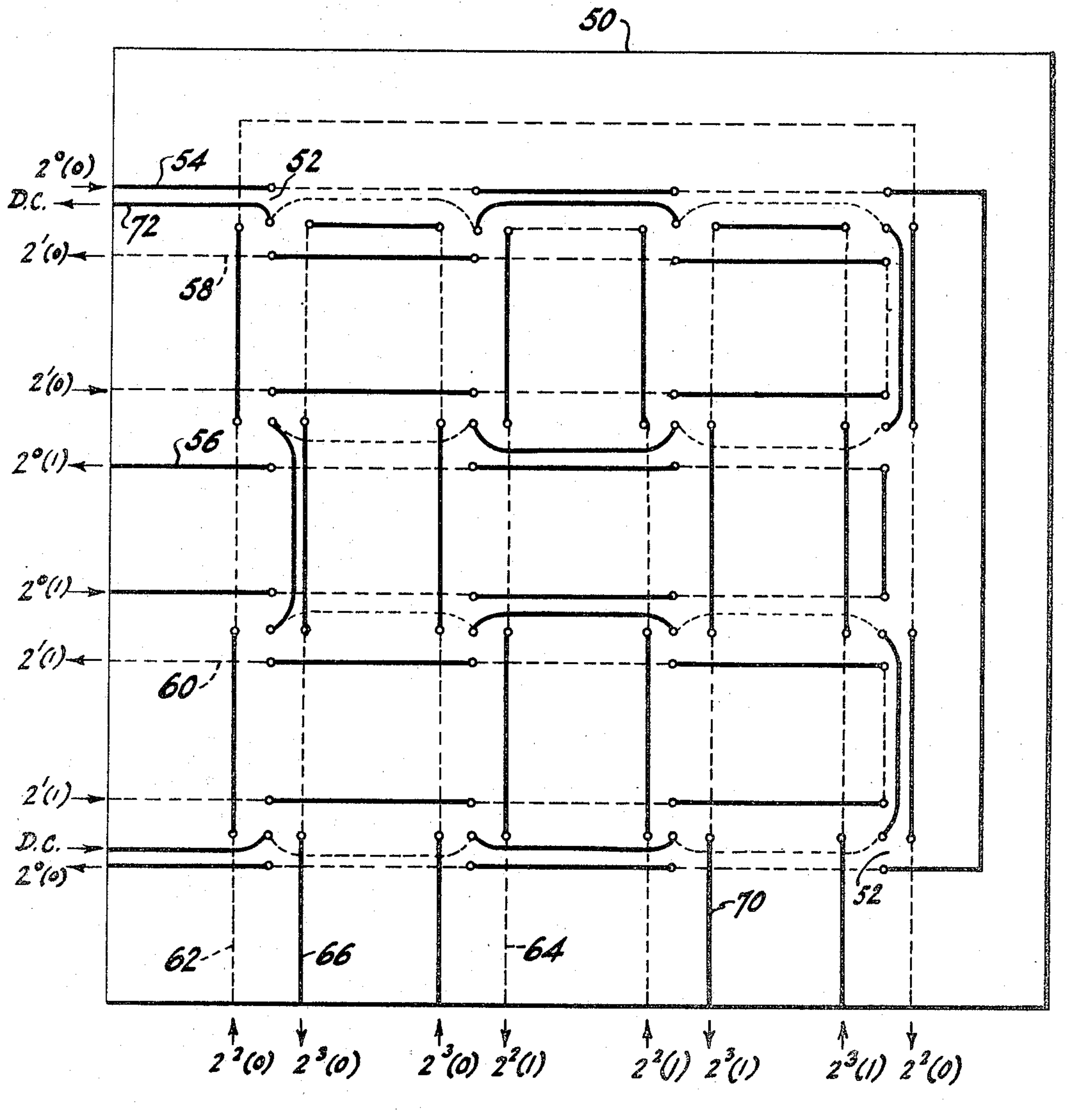
FIG. 4 is a schematic diagram of another apertured plate according to the invention having five apertures per cluster, and useful in combinatorial switching applications.

Other types of combinatorial switches can be obtained by providing clusters with different groupings of apertures in a plate. For example, as shown in FIG. 4, a 16 position combinatorial type switch is achieved using five separate apertures in each cluster 52. Four selecting windings and a common bias winding are printed through the five apertures of each cluster 52. The selecting windings are interconnected to provide four pairs of selecting coils. Any one of the clusters 52 may be selected by applying a selecting current to one selecting coil in each of the four pairs of selecting coils. The net excitation produced by the four selecting currents is sufficient to produce an appreciable flux change in the material about the selected cluster. The non-selected clusters receive insufficient net magnetizing force to produce any appreciable flux change in the portions of material adjacent their apertures. One suitable manner of providing the four pairs of selecting coils is shown in FIG. 4. The first and last rows of clusters 52 are linked in successively opposite senses by a first winding 54, designated as the $2^0(0)$ selecting winding. One of the apertures of each cluster of the second and third rows of clusters 52 are linked by a second selecting winding 56 designated as the $2^0(1)$ selecting winding. Another of the apertures of each cluster of the first and second rows of clusters 52 are linked by a third selecting winding 58 designated as the $2^1(0)$ selecting winding. The third and fourth rows of clusters 52 are linked by a winding designated as the $2^1(1)$ winding 60. Similarly, the first and fourth columns of clusters 52 have one of the apertures of each cluster linked via a $2^2(0)$ winding 62; each cluster 52 of the second and third columns has one of its apertures linked via a $2^2(1)$ winding 64; each cluster 52 of the first and second columns has one of its apertures linked via a $2^3(0)$ winding 66; and each cluster 52 of the third and fourth columns has one of its apertures linked via a $2^3(1)$ winding 70. All the clusters 52 have corresponding apertures linked via a D.C. bias winding 72.

The four binary digits $2^0$–$2^3$ are sufficient to identify any one of the 16 clusters 52. The D.C. bias current is made of sufficiently large amplitude such that the portion of material between any adjacent cluster 52 is saturated in one state in the absence of two selecting currents flowing through two of the apertures of a cluster 52 at the same time. The non-selected clusters 52 each have either one or no selecting current flowing through its apertures.

The electrical operation of a switching device corresponding to that provided by the apertured plate 50 is well-known, and therefore is not described further in detail.

Figure 5:
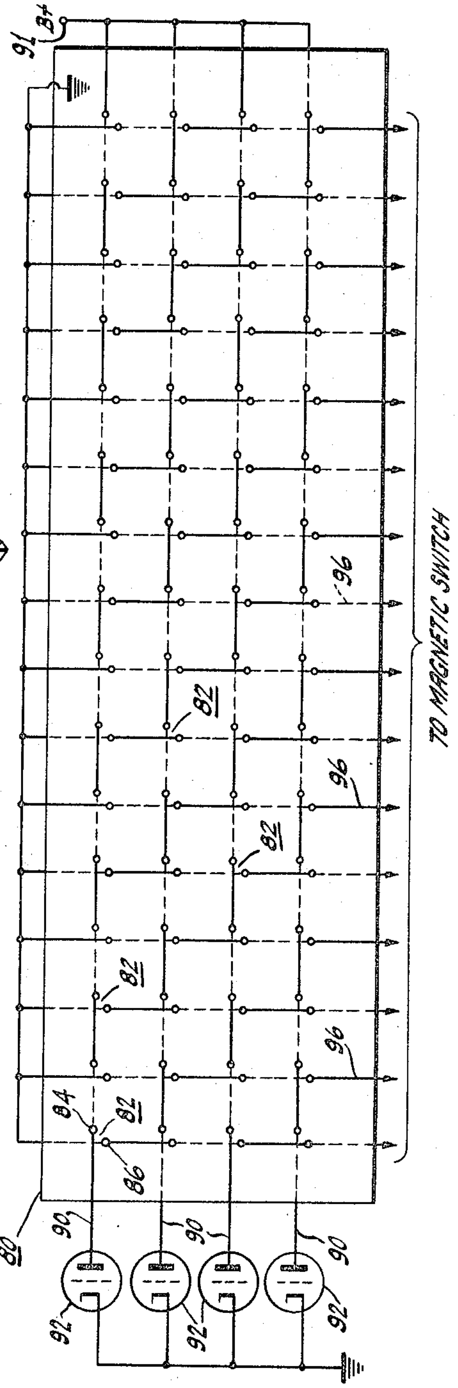
FIG. 5 is a schematic diagram of another apertured plate according to the invention having two apertures in each cluster and used in a switching system.

Other forms of combinatorial type switches known may be obtained in similar fashion using the clusters of apertures. For example, a rectangular array shown in schematic form in FIG. 5 has sixteen columns and four rows of clusters 82. Each cluster 82 is provided with at least two apertures; a row aperture 84, and a column aperture 86. An output aperture, not shown, also may be provided in each cluster 82. Successive ones of the row lines link successive ones of the row apertures 84 in successively opposite senses. After linking the row apertures, the row lines 90 are connected to a common supply point 91. A different electronic device for applying currents to the row lines successively, such as vacuum tubes 92 may be connected to each different row line 90. The corresponding apertures of each column of clusters 82 are linked by a different one of sixteen column lines 96. The column lines 96 may be connected to the outputs of another magnetic switch. After linking all the apertures of the plate 80, all the apertures are connected to a point of common reference potential, indicated in the drawing by the conventional ground symbol. A separate output conductor, not shown, may be threaded through one aperture of each cluster, or through the separate output aperture referred to above. The electrical operation of a switching device corresponding to that provided by the apertured plate 80 also is well-known.

There have been described herein improved magnetic storage and switching devices using apertured plates of rectangular hysteresis loop magnetic material. Each switching or storage device in a plate has a plurality of clusters of apertures. In the described switching devices, the switching currents may be arbitrarily large without producing undesirable flux changes in the material about non-selected ones of the switching apertures. In storage applications, the signal-to-noise ratio is improved due to the half-amplitude selecting currents producing flux changes which do not link the common output winding.

What is claimed is:

1. A magnetic device comprising a plate of substantially rectangular hysteresis loop material, said plate having first and second groups of clusters of apertures therein, the respective apertures of a cluster having a relatively small center-to-center spacing so that the cluster effectively provides a single magnetic element defined by the portion of material around all of said apertures, said element having two remanent states, the first of said states corresponding to flux established by application of currents of one polarity through one or more of the apertures of the cluster and the other remanent state corresponding to that established by current flow of opposite polarity through one or more of the apertures, each of said currents being above a selected minimum value, any one said cluster being common to one said first and one said second group, a first set of selecting windings each linked through one aperture of each cluster of a different said first group, a second set of selecting windings each linked through another aperture of a different said second group, and a further winding linked through a third aperture all of said clusters.

2. A magnetic device as claimed in claim 1, said selecting windings and said further winding each being printed on the surfaces of said plate and on the inside walls of said apertures.

3. A magnetic device of substantially rectangular hysteresis loop material having clusters of apertures in said material, the respective apertures of a cluster having a relatively small center-to-center spacing so that the cluster effectively provides a single magnetic element defined by the portion of material around all of said apertures, said element having two remanent states, the first of said states corresponding to flux established by application of current of one polarity through at least one of the apertures of the cluster and the other remanent state corresponding to that established by current flow of opposite polarity through at least one of the apertures, each of said currents being above a selected minimum value, and a plurality of selecting windings each linked through a different aperture of any one of said clusters, certain of said selecting windings linking first groups of said clusters, and certain others of said selecting windings linking second groups of said clusters, the clusters of any one of said first groups of clusters each being in common with one cluster of a different one of said second groups of clusters.

4. A magnetic device as claimed in claim 3, wherein said clusters are arranged in rows and columns, said first groups being the said rows of clusters, and said second groups being the said columns of clusters.

5. A magnetic device comprising a plate of substantially rectangular hysteresis loop material having a plurality of clusters of apertures, the respective apertures of a cluster having a relatively small center-to-center spacing so that the cluster effectively provides a single magnetic element defined by the portion of material around all of said apertures, said element having two remanent states, the first of said states corresponding to flux established by application of current through at least one of the apertures of the cluster to apply a net magnetizing force in one sense to said element, and the other remanent state corresponding to that established by current flow through at least one of the apertures to apply a net magnetizing force in the opposite sense to said element, each of said currents being above a selected minimum value, said clusters being arranged in rows and columns, a plurality of row selecting windings each linking one aperture of each cluster of a different said row, a plurality of column selecting windings each linking another aperture of each cluster of a different said column, and a common winding linking still another aperture of all said clusters.

6. A magnetic device as claimed in claim 5, said plate being of ferrite material and said windings each being formed of conductive metallic material printed on both said plate surfaces and on the inside walls of the apertures linked thereby.

7. A magnetic device as claimed in claim 5, including a plurality of other windings, each said other winding being linked through a further aperture of a different one of said clusters.

8. A magnetic device comprising a plate of substantially rectangular hysteresis loop material having a plurality of clusters of apertures therein arranged in rows and columns, the apertures of any one cluster having a relatively small center-to-center spacing to provide a single magnetic element defined by the material about that one cluster, said element having two remanent states a plurality of first pairs of selecting windings, each selecting winding of a first pair being linked through a different pair of said rows, and a plurality of second pairs of selecting windings, each selecting winding of a second pair being linked through a different pair of said columns, any one of said apertures having but one selecting winding linked therethrough, and any one of said clusters being common to at least one of said first and one of said second pairs of selecting windings.

9. A magnetic device as claimed in claim 8, said plate being of ferrite material and said windings being formed of conductive metallic material printed on said plate surfaces and on the inside walls of the apertures thereby.

10. A magnetic device as claimed in claim 8, including a common winding linked through one aperture in each of said clusters.

11. A magnetic device comprising an element having two remanent states, said element considering of magnetic material around a plurality of closely spaced apertures, the spacing being such that the legs between said apertures do not function as storage positions, separate selecting windings linked through said apertures, means for setting said element to one of said remanent states comprising means for applying selecting currents to at least one of said selecting windings to produce a net magnetizing force in one sense to establish said one remanent state, and means for setting said element to the other of said remanent states comprising means for applying selecting currents to at least one of said selecting windings to produce a net magnetizing force in the opposite sense to change said element to said other remanent state.

References Cited by the Examiner

UNITED STATES PATENTS

| | | | |
|---|---|---|---|
| 2,870,433 | 1/1959 | Simpson | 340—174 |
| 2,926,242 | 2/1960 | Rogers | 307—88 |
| 2,942,240 | 6/1960 | Rajchman et al. | 340—174 |

FOREIGN PATENTS

| | | |
|---|---|---|
| 1,136,322 | 12/1956 | France. |
| 788,351 | 1/1958 | Great Britain. |

BERNARD KONICK, *Primary Examiner.*

EVERETT R. REYNOLDS, IRVING L. SRAGOW, L. W. MASSEY, J. W. MOFFITT, R. R. HUBBARD, *Assistant Examiners.*